July 28, 1970   M. WISMER ET AL   3,522,142
GLASS LAMINATE WITH SILICON-CONTAINING POLYURETHANE
Filed Feb. 24, 1965
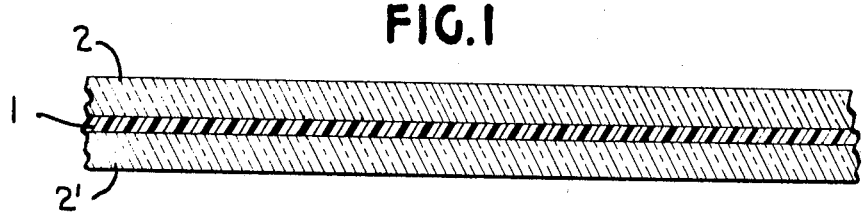
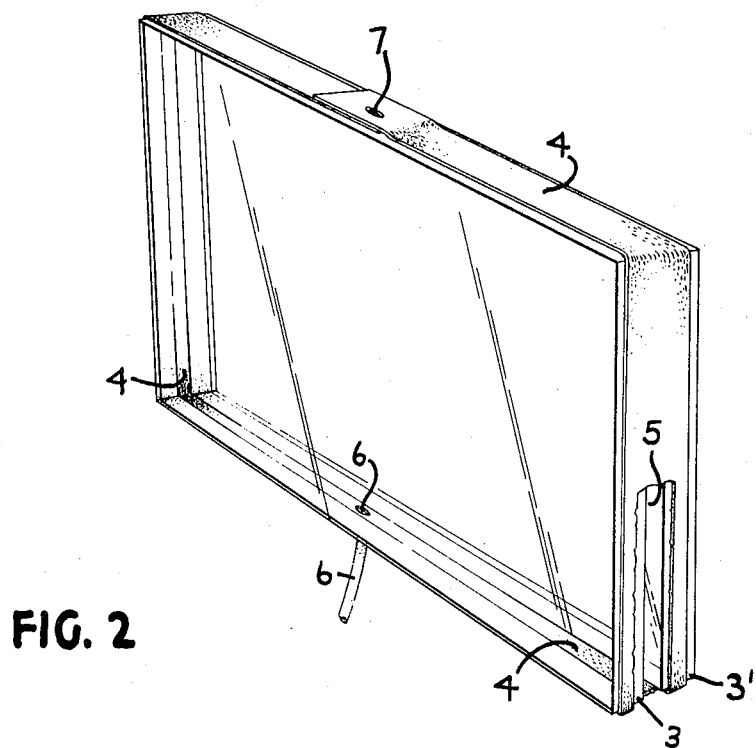
INVENTORS
VERNON G. AMMONS and
MARCO WISMER
GERALD W. MILLER
BY Chisholm and Spencer
ATTORNEYS United States Patent Office 3,522,142
Patented July 28, 1970

3,522,142
GLASS LAMINATED WITH SILICON-CONTAINING POLYURETHANE
Marco Wismer, Gibsonia, Vernon G. Ammons, Glenshaw, and Gerald W. Miller, Pittsburgh, Pa., assignors to PPG Industries, Inc., Pittsburgh, Pa., a corporation of Pennsylvania
Filed Feb. 24, 1965, Ser. No. 434,773
Int. Cl. B32b 17/10; C03c 27/12
U.S. Cl. 161—190
22 Claims

ABSTRACT OF THE DISCLOSURE

Laminated glass articles, useful as safety glass for windshields and the like, comprise at least one solid glass sheet and a silicon-containing polyurethane produced by the reaction of an organic polyisocyanate and a polyfunctional organosilicon compound. Such laminates can be produced by curing the polyurethane while in contact with the glass sheet.

---

This invention relates to laminated glass articles such as those of the type commonly known as safety glass, and more particularly to laminated safety glass in which the interlayer is a silicon-containing polyurethane.

Glass laminates have become widely used, chiefly in the glass areas of automobiles and aircraft and in similar applications in which the tendency of glass to shatter when broken must be controlled. The safety glass in common use is a laminated glass sandwich, in which a sheet of transparent resinous material is interprosed between two or more sheets of glass.

Interlayers used in such applications must have several properties difficult to achieve in combination, including good adhesion to the glass and sufficient shear and tear strength to prevent rupture by the broken glass. Also, the interlayer should have a high impact energy absorption level in order to withstand impact, and should have good optical properties. Further, the interlayer must be able to retain these properties after sustained exposure to variations in temperature, exposure to sunlight, and other conditions encountered during normal usage.

The most widely used interlayer material is plasticized polyvinyl butyral. Difficult processing conditions are required to produce safety glass utilizing this interlayer, such as laminating techniques involving high temperatures and pressures between 150 and 200 pounds per square inch. The safety glass obtained, while possessing acceptable characteristics for many ordinary uses, such as in automobiles, is seriously deficient in strength at high temperatures.

The lack of high temperature strength makes polyvinyl butyral laminates unsuited for uses in which such temperatures may be encountered, as in oven or furnace doors and in windshields for high-speed aircraft and other vehicles. Also, the necessity for producing these laminates at severe conditions of temperature and pressure, as in an autoclave, both increases the cost of the laminated safety glass and limits its utility for many applications. For example, architectural uses for such laminates may require dimensions which cannot be conveniently produced by such a process. A great many of the disadvantages of the laminated glass heretofore available could be eliminated by the use of cast and cured-in-place interlayer materials, but such processes have not been successful heretofore because of the lack of suitable materials to provide the necessary properties when applied in this manner.

It has now been found that laminated glass articles in which certain silicon-containing polyurethanes are employed as the interlayer provide several important advantages over the glass laminates known in the art, such as increased resistance to high temperatures and good strength at both very low and very high temperatures. It has further been found that such laminates can be successfully produced by casting a silicon-containing polyurethane composition between the glass sheets and allowing it to cure in place.

In the accompanying drawings, FIG. 1 is a cross-sectional view of a laminate of the invention where the silicon-containing polyurethane interlayer 1 is interposed between two sheets of glass 2 and 2'. FIG. 2 is an isometric view of a casting cell which can be used to prepare glass laminates by casting the silicon-containing polyurethane and curing it in place. The casting cell shown is comprised of two parallel sheets of glass 3 and 3' bound together at their periphery by Mylar tape 4, leaving space 5 between them. Inlet 6 is provided for entry under pressure of the interlayer material, and air outlet 7 permits venting of air as the interlayer fills chamber 5. At the inner end of inlet 6, it is desirable to provide a self-closing valve (not shown) in order to prevent the backflow of the uncured polyurethane.

The laminated glass articles to which this invention pertains comprise at least one glass sheet having thereon an adherent layer of a polyurethane made by the reaction of an organic polyisocyanate and a polyfunctional organosilicon compound having at least two active hydrogen-containing groups. The active hydrogen-containing groups generally contain hydroxyls, but others containing groups such as amino or mercapto groups are also useful. The total number of active hydrogen atoms per average molecule in the polyfunctional compound should be greater than two. The term "active hydrogen" as employed herein refers to active hydrogen atoms as determined by the Zerewitinoff method, i.e., which are reactive with Zerewitinoff reagent.

The requirement that the polyfunctional compound have an average of more than two active hydrogen atoms per molecule means that at least some of the molecules will have three or more active hydrogen atoms. The number of active hydrogen atoms per average molecule is sometimes called the "functionality" of the material.

Various types of silicon-containing polyfunctional compounds can be employed in the invention, provided that the silicon is in an organic molecule and the compound contains at least two hydroxyl or mercapto groups. The nautre of the polyfunctional compound can be varied widely, with the particular substituents and organic radicals present being chosen so as to provide stability to the molecule and compatibility with the organic polyisocyanate employed. For example, in the preferred compositions in which the isocyanato-terminated polyether adducts containing oxytetramethylene groups are utilized, it is desirable that the organosilicon compound contain phenyl groups in order to provide optimum compatibility. While complete compatibility is not always essential, the compatibility of any particular polyfunctional organosilicon material with an organic polyisocyanate is easily determined by admixing them and noting any lack of clarity, which is indicative of poor compatibility.

Hydroxyl-containing polyfunctional organosilicon compounds are preferred for use in the invention. Such silicon-containing polyols can be of varying structures, such as the silanols or siloxanols, or the corresponding cyclic compounds. It is also preferred that the polyfunctional organosilicon compound contain active hydrogen atoms as part of groups of the structure —OX, where X is a substituted hydrocarbon radical containing at least one hydroxyl, mercapto or other active hydrogen-containing group.

Such a preferred type of organosilicon compound is obtained as the product of the reaction of an organosilicon compound containing at least one silicon atom and at least two silicon-bounded hydroxyl or alkoxy groups, with a polyfunctional alcohol containing at least one alcoholic hydroxyl group and a total of at least two active hydrogen-containing groups. The organosilicon compound and the polyfunctional alcohol react with the evolution of water or the alcohol corresponding to the alkoxy group of the organosilicon compound.

While the nature of the product thus obtained is not fully understood, it is known that the active hydrogen-containing groups are bonded to an oxygen atom, which is in turn bonded to a silicon atom. Even though the expected amount of alcohol or water is obtained, it has been found that the reaction product in many instances contains free polyfunctional compound, thus indicating that the nature of the reaction is complex. A polyurethane interlyer can be produced from this reaction product as it is obtained, including the free polyfunctional compound, or, if desired, the free polyfunctional compound can be first removed by extraction, distillation, or similar means.

In producing the aforesaid reaction products, the reaction conditions are not critical, with moderate temperatures being usually employed along with, in some cases, an ester interchange catalyst, such as a tetraalkyl titanate. The desired number of average active hydrogen atoms in these reaction products is obtained by employing a suitable ratio of reactants and extent of reaction, depending upon the number of active hydrogen-containing groups on the polyfunctional alcohol and the number of reactive hydroxyl and/or alkoxy groups on the organosilicon compound. The functionality of the product is based upon the number of active hydrogens in the reactants and the amount of water and alcohol evolved, which is taken as indicative of the extent of reaction. In this connection, it has been found that only one functional group of the polyfunctional alcohol tends to react with the organosilicon compound, even though an excess of reactive sites on the organosilicon compound is present.

The organosilicon compound employed to produce the reaction product can be of varying types. For example, substituted silanes, organosilanols and organosiloxanes can all be employed, as can the corresponding cyclic compounds, e.g., cyclosilanes. One preferred class of organosilicon compounds comprises the alkoxy or hydroxyl-substituted organosiloxanes, siloxanes being considered as compounds having at least one

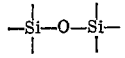

linkage. Among these preferred organosiloxanes are those of differening structures, including, for example, cyclic organosiloxanes such as those of the structure:

(I)
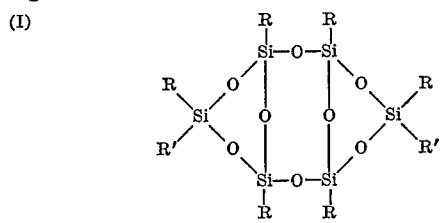

An especially preferred class of siloxanes has the structure:

(II)
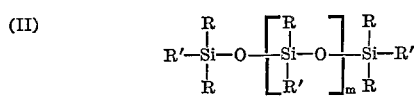

The groups designated by R in the above formulas can be alkyl or alkoxy of 1 to 4 carbon atoms, such as methyl, ethyl, propyl or butyl, or methoxy, ethoxy, propoxy or butoxy. They can also be aryl groups, such as phenyl or tolyl. In the case of the substituted silanes, at least one R group should be alkyl or aryl. The groups represented by R' are either hydroxyl groups or alkoxy groups, such as ethoxy, methoxy, propoxy, butoxy or the like. In Formula II, the value of m can be from 0 to about 7.

Organosilicons other than siloxanes are also useful. For instance, a desirable class of organosilicon compounds are substituted silanes of the structure:

(III)
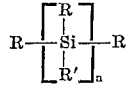

where the groups represented by R and R' are as above and n is from 1 to about 3. When n is 1, at least one of the groups represented by R should be alkoxy.

The compounds mentioned do not constitute all the organosilicon compounds that can be utilized, but are illustrative of the large class of such compounds that can be used; it is necessary only that at least two silicon-bonded hydroxyl or alkoxy groups be present.

The polyfunctional alcohol can be any organic compound having at least one alcoholic hydroxyl group and at least one other active hydrogen-containing functional group, as described above. By "active hydrogen-containing functional group" it is meant to include groups which contain or engender active hydrogen atoms as defined hereinabove. Polyols are preferred, but substituted alcohols having, for example, mercapto groups can also be utilized. An especially preferred polyol is trimethylolpropane, which has been found to provide a desirable combination of convenience in use and excellent results.

Among the numerous polyols which can be employed to advantage in producing the hydroxyl-containing reaction products are aliphatic polyols, aralkyl polyols, alicyclic polyols, polyether polyols, polyester polyols, and, in general, any polyol containing a plurality of active hydrogen-containing hydroxyl groups. Some specific examples of such polyols are ethylene glycol, propylene glycol, 1,3-butanediol, 1,4-butanediol, glycerol, trimethylolethane, trimethylolpropane, hexamethylene glycol, pinacol, hexanetriol, erythritol, pentaerythritol, paraxylenediol, 1,4-cyclohexanedimethanol, mannitol, and other polyhydroxy alcohols having, for example, 2 to 10 hydroxyl groups and 2 to 20 carbon atoms.

Various polyether polyols are included, such as poly (oxyalkylene) polyols, e.g., the polyoxypropylene adducts of trimethylolpropane known as Pluracols, for example, that known as Pluracol TP-440 which has a hydroxyl number of 400 and a molecular weight of 425.

The reaction products herein can also be made from polyester polyols, such as that produced from phthalic anhydride and 2 moles of trimethylolpropane and having a hydroxyl number of 540 and a molecular weight of 416, or from resinous polyols, such as homopolymers of allyl alcohol, methallyl alcohol, or other unsaturated alcohols, or copolymers of such alcohols with styrene, acrylonitrile, or other ethylenic monomers.

In addition to the preferred polyhydroxy compounds, other polyfunctional alcohols such as those containing both hydroxyl and mercapto groups can be employed, examples of these being thioalcohols, such as mercaptoethanol, 1-mercapto-2-propanol, 1-mercapto-2-butanol, and the like.

Mixtures of polyfunctional alcohols can be employed to attain the desired functionality. For instance, the reaction of 2 moles of a 4 to 1 molar mixture of 1,4-butanediol and trimethylolpropane with dimethyltriphenyltrimethoxytrisiloxane gives an organosilicon reaction product with a functionality of 2.2.

In addition to the above preferred reaction products and similar compounds having

groups, there may be included organosilicon polyfunctional compounds having at least two active hydrogen-containing groups attached to silicon either directly or through a carbon atom or chain. For instance, compounds having hydroxyl groups bonded to silicon or as a part of hydroxyl-containing hydrocarbon groups directly bonded to silicon can be employed in the invention as all or part of the polyfunctional organosilicon compound. These include dihydrocarbon silanediols, such as diphenylsilanediol, butyloctylsilanediol, ditolylsilanediol and di-(diphenyl)silanediol; hydroxyalkyl-substituted silanes and siloxanes, such as dimethyldimethylolsilane, tetramethyldimethyloldisiloxane and methyltrimethyloldiphenyltrisiloxane; and other similar materials, either monomeric or polymeric.

The polyurethane interlayers of the invention are produced by reacting the organosilicon polyfunctional compounds described above with an organic polyisocyanate which can be a hydrocarbon polyisocyanate, an isocyanato-terminated "prepolymer," or any other organic compound containing two or more isocyanato groups, or with a mixture of such compounds.

Among the hydrocarbon polyisocyanates that can be utilized are aromatic, aliphatic and cycloaliphatic diisocyanates and triisocyanates, as well as combinations of these types. Representative hydrocarbon polyisocyanates include 2,4-tolylene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, 1,5-naphthylene diisocyanate, 1,4-tetramethylene diisocyanate, 1,6-hexamethylene diisocyanate, 1,10-decameythlene isocyanate, 1,4-cyclohexylene diisocyanate, 4,4'-methylenebis(cyclohexyl isocyanate), 1,5-tetrahydronapthylene diisocyanate, p-xylylene diisocyanate, durene diisocyanate and 1,2,4-benzene triisocyanate.

The polyisocyanates may contain other substituents, although, in general, those which are free from reactive groups other than the isocyanato groups are ordinarily preferred. Dimers of monomeric diisocyanates, and di-(isocyanato-aryl)ureas, such as di(3-isocyanato-4-methylphenyl)urea, may also be used.

Particularly useful organic polyisocyanates are the so-called "prepolymers" in which a polyisocyanate is partially reacted with a polyhydroxy compound or other compound having two or more active hydrogen atoms, to provide an isocyanato-terminated product that is easily handled and employed. The organic polyisocyanates used to prepare such prepolymers include any of the various compounds discussed above.

Any polyfunctional active hydrogen-containing compounds, such as those mentioned above, can be used to prepare prepolymers suitable for use herein, and especially desirable are isocyanato-terminated adducts of an organic polyisocyanate and a polyester polyol or a polyether polyol. These include the isocyanato-terminated adducts of various saturated and unsaturated polyester polyols made from esterification of polyols and dibasic acids, such as that formed from the reaction of tolylene diisocyanate with a polyester formed from propylene glycol and adipic acid. Such polyester adducts are well known and are utilized in the manufacture of conventional types of polyurethanes.

Other organic polyisocyanates of particular utility herein include the prepolymers which are isocyanato-terminated polyether adducts of an organic polyisocyanate and a polyether polyol. These are similar to the polyester adducts, except that they include ether linkages rather than ester groups. They are also well known and extensively used. Examples of these are reaction products of diisocyanates with polyether polyols produced from the reaction of alkylene oxide and polyhydric compounds, such as sorbitol, pentaerythritol, glycerol, sucrose, and the like. Preferred, commercially available polyether adducts useful in the present invention are made from tolylene diisocyanate and poly(oxytetramethylene) glycol. Still other prepolymers of varying types, for example, those produced from nitrogen-containing polyols, such as reaction products of alkylene oxides and urea and similar compounds can also be employed.

The glass laminates of the invention are produced by placing the organic polyisocyanate and the organosilicon compound in contact with at least one, and usually two or more, glass sheets and allowing the composition to cure. Usually, the premixed materials are poured between glass sheets which have been previously spaced the desired distance and sealed at the edges, but other application methods can be employed, such as spreading the reactants on one sheet and pressing another onto the mixture. When only one glass member is used, the other interlayer surface can remain exposed or a layer of plastic or other material can be placed thereon. In a casting cell, release agent can be applied to the side member to which adhesion is not desired.

The curing reaction does not require any special conditions. For optimum properties, it is best to employ stoichiometric or nearly stoichiometric ratios of the isocyanato groups to active hydrogen in the organosilicon product; the ratio is generally between 0.9 and 1.1 to 1, but other proportions can be used. The reaction takes place upon admixing the reactants and is relatively slow at room temperature, so that moderate heating, e.g., to about 100° F. to 400° F., is usually employed.

The type of glass employed in the laminates is not critical and can be of any composition to provide the desired optical and strength properties. Imperfections in the glass surface are relatively unimportant with the present type of interlayers, except as related to any desired optical standards, since good adhesion is obtained regardless of such imperfections. The laminates produced are strong and clear and have those properties necessary for an acceptable safety glass, including flexibility and strength at temperatures as low as −65° F. In addition, they have improved resistance to prolonged exposure to high temperatures, such as 300–400° F.

The invention will be further described by reference to the following examples. These examples are illustrative and should not be construed so as to limit the invention to their details. All parts and percentages are by weight unless otherwise specified.

Where toluene diisocyanate is employed in the examples, there was used the ordinary mixture of 80 percent 2,4-isomer and 20 percent 2,6-isomer. In several of the examples there are employed certain prepolymers produced from poly(oxytetramethylene) glycols and toluene diisocyanate, which have the following approximate structure:

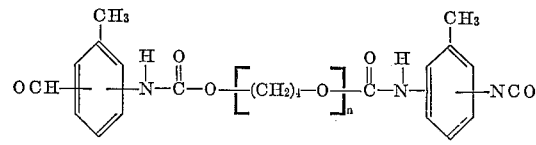

For convenience, the prepolymer of the above type which has a molecular weight of about 1302 (i.e., where $n$ equals about 13), and which is produced from poly(oxytetramethylene) glycol with a molecular weight of about 954, is termed Prepolymer A. It has an isocyanate (NCO) content of about 6.40 percent. Another corresponding prepolymer, termed Prepolymer B, has a molecular weight of about 870 ($n$ equals 7) and is produced from poly(oxytetramethylene) glycol having a molecular weight of about 522. Its NCO content is about 9.34 percent.

EXAMPLE 1

(a) Preparation of organosilicon reaction product

A glass reaction vessel fitted with thermometer, condenser, stirrer, azeotropic distillation trap and inert gas outlet was charged with 402 parts (3.0 moles) of trimethylolpropane and 470 parts (1.0 mole) of dimethyltriphenyltrimethoxytrisiloxane. While sparging with inert gas, this mixture was heated slowly with stirring for 2 hours and 20 minutes, during which time the temperature reached 115° C. During the heating, the evolved methanol was continuously removed in the azeotropic distillation trap. A total of 94.4 parts of methanol were obtained, compared to the expected 96 parts. The hydroxyl value of the product was 416.5.

(b) Preparation of laminate

A mixture of 60 parts of Prepolymer A and 40 parts of Prepolymer B was degassed by heating at 200° F. with stirring at 2 millimeters pressure for 1½ hours. To this there were added 24.0 parts of the reaction product made above, and the resultant mixture was degassed for an additional 5 minutes. The hot mixture was poured into a casting cell made from two 12-inch by 16-inch sheets of 3/16-inch thick plate glass spaced 100 mils apart and sealed at the edges with polyethylene terephthalate tape. After curing for 6 hours at 285° F., the tape was removed; the laminate was perfectly transparent and essentially colorless, and had excellent heat resistance, as shown by tests in which the laminate was heated to 365° F. over a 40 minute period. The laminate was maintained at this temperature for 6 hours before the first bubble appeared in the interlayer, and there was no noticeable discoloration and no seepage of interlayer material from the unprotected edges. By contrast, plasticized polyvinyl butyral, extensively used as an interlayer material both for automobiles and aircraft, bubbles and discolors in considerably shorter times in similar tests, even at lower temperatures, e.g., 250° F. to 275° F.

EXAMPLE 2

Example 1 was repeated except that the laminate was produced from ⅛-inch plate glass spaced 21 mils apart, and the interlayer composition was as follows:

|  | Parts by wt. |
|---|---|
| Organosilicon product | 23.81 |
| Prepolymer A | 50.0 |
| Prepolymer B | 50.0 |

The laminate obtained again had excellent properties. In addition to excellent heat resistance, it withstood the dropping of a ½ pound steel ball from a height of 35 feet; both plies of glass were broken but there was no penetration by the ball and no separation of glass and interlayer.

EXAMPLE 3

An organosilicon reaction product was produced by mixing and heating 53.6 parts of trimethylolpropane, 0.3 part of tetrabutyl titanate and 240 parts of octamethyloctaphenyldimethoxyoctasiloxane. Heating was carried out for 3 hours at a maximum temperature of 150° C., during which time 15.2 parts of methanol were evolved and removed. The product, which had a hydroxyl value of 156.3, was employed in producing a laminate as in Example 1(b). A comparable laminate was obtained which required about 7 hours heating at 365° F. before the first bubble appeared in the interlayer.

EXAMPLE 4

Substantially similar results to those above were obtained by substituting for the organosilicon reaction product of Example 1 the product of 5 moles of trimethylolpropane with 3 moles of phenyltriethoxysilane having a hydroxyl value of 768. The laminate withstood heating at 365° F. for 9 hours before the interlayer showed any bubbles.

EXAMPLE 5

Dimethyltriphenyltrimethoxytrisiloxane was partially hydrolyzed by refluxing a mixture of 200 parts of the siloxane, 3.3 parts of water, 3.3 parts of methanol, and 1 part of glacial acetic acid. The product had a methoxy content (Zeisel procedure) of about 15 percent. A mixture of 207 parts of the partially polymerized siloxane and 134 parts of trimethylolpropane was heated for 2 hours at a maximum temperature of 197° C. to produce an organosilicon reaction product having a hydroxyl value of 362.6. During the reaction, there were removed 41 parts of methanol. Example 1(b) was repeated with this reaction product substituted for the organosilicon reaction product therein. The laminate produced had good properties including resistance to elevated temperatures, withstanding temperatures of 365° F. for 5 hours before bubbles were observed.

EXAMPLES 6 TO 10

These examples were carried out in the manner of the above examples. Dimethyltriphenyltrimethoxytrisiloxane and various polyfunctional alcohols were reacted to produce organosilicon reaction products of different types and having varying functionalities, and these were then reacted with an organic polyisocyanate to produce glass laminates as described above. An equal amount of isocyanate and active hydrogen on an equivalent basis was employed in each instance. The laminates were tested by heating at 365° F. as above. The data are shown in Table I.

TABLE I

| Example | Polyfunctional Alcohol | Moles | Functionality | Organic Polyisocyanate | Resistance to 365° F. (Hours) |
|---|---|---|---|---|---|
| 6 | 1,4-butanediol / Trimethylolpropane | 2 / 1 | 4 | 60 parts Prepolymer A / 40 parts Prepolymer B | 5 |
| 7 | 1,4-butanediol / Trimethylolpropane | 1 / 2 | 5 | Toluene diisocyanate | 6 |
| 8 | Trimethylolpropane | 3 | 6 | Prepolymer B | 5.8 |
| 9 | Cyclohexanedimethanol / Trimethylolpropane | 2 / 1 | 4 | Prepolymer B | 4 |
| 10 | 1,4-butanediol / Trimethylolpropane | 2 / 1 | 4 | 60 parts Prepolymer A / 40 parts Prepolymer B | 5 |

Laminates can also be produced in accordance with the invention herein by utilizing a prepolymer of the organosilicon reaction product, that is, by reacting an excess of polyisocyanate with the organosilicon reaction product to produce an isocyanate terminated product, and then reacting this product with an active hydrogen-containing compound to provide the interlayer. This embodiment is illustrated by the following example.

EXAMPLE 11

One mole of dimethyltriphenyltrimethoxytrisiloxane was reacted with 2.5 moles of 1,4-butanediol in the manner described above. One equivalent of this organosilicon reaction product (hydroxyl value 236.3) was added to 1 mole of toluene diisocyanate over a period of 5 minutes while maintaining the temperature at about 80° C., and the mixture was stirred for 4 hours. The prepolymer obtained had an isocyanate equivalent weight of 398.4. A laminate was produced with an interlayer made by reacting one equivalent of the prepolymer with one equivalent of the above organosilicon reaction product (hydroxyl value 236.3), using the procedure of the above examples. The laminate obtained had fair to good properties, including resistance to 365° F. for 2.5 hours.

The foregoing results illustrate the exceptional strength retention of the laminates of this invention at elevated temperatures. Similar results are attained by making laminates in the manner of the above examples but using various other interlayers of the class described. Several examples of such additional interlayer materials that may be employed in place of those of the above examples are as follows:

EXAMPLE 12

Using a procedure similar to that of Example 1, a mixture of 68.1 parts of diphenyldiethoxysilane and 67 parts of trimethylolpropane was heated to 189° C. over a 10-hour period. There were obtained a total of 27 grams of ethanol during the reaction and the product obtained had a hydroxyl value of 558. An interlayer material was prepared from 10 parts of Prepolymer B, 15 parts of Prepolymer A and 4.5 parts of the organosilicon reaction product produced above.

EXAMPLE 13

Following the procedure of Example 1, a mixture of 80.1 parts of phenyltriethoxysilane and 134 parts of trimethylolpropane was reacted by heating to 165° C. over 1 hour and 40 minutes. A total of 46 parts of ethanol was evolved and the product obtained had a hydroxyl value of 768. An interlayer material was produced from a mixture of 10 parts of Prepolymer B, 15 parts of Prepolymer A, and 3.3 parts of the above reaction product.

EXAMPLE 14

A reaction vessel was charged with 732 parts of Pluracol TP-740, 300 parts of xylene, and 436 parts of a cyclic organosiloxane, the organosiloxane corresponding to Formula (I) above, with R representing phenyl and R' hydroxyl. Pluracol TP-740 is a propylene oxide adduct of trimethylolpropane, having a hydroxyl value of 230 and an equivalent weight of 244. This mixture was heated to 130° C. with stirring and sparging with inert gas, and then further heated to 156° C. over a 2-hour period. The water evolved was removed by azeotropic distillation. After the reaction, the xylene and any residual water were distilled off, leaving a product having a hydroxyl value of 140.2. A mixture of 60 parts of Prepolymer B and 90 parts of Prepolymer A was heated to 100° C. and degassed at 1 millimeter pressure for 10 minutes. There were then added 108 parts of the above organosilicon reaction product and after degassing for 3 minutes at 1 millimeter pressure, this mixture was poured between glass sheets and cured for 6 hours at 285° F.

As indicated hereinabove, one of the advantages of the present laminates is their strength retention over a wide range of temperatures. This was illustrated by tests such as those in which a ½-pound steel ball was dropped from various heights onto the laminates with the laminates at varying temperatures. In Table II below are some data obtained in this fashion, using laminates, made as in Example 1 above, having an interlayer thickness of 20–22 mils. The values given are the maximum height from which the ball can be dropped without penetration through the laminate. For comparison, the corresponding values for a similar laminate made with the conventional interlayer material (25 mils thick) known as "Aircraft Vinal"; this is a plasticized polyvinyl butyral commonly utilized in aircraft glass areas.

TABLE II

| Interlayer | 0° F. ft. | 250° F. ft. |
|---|---|---|
| Example 1 | 14 | 4 |
| Aircraft Vinal | 8 | 0 |

While the foregoing examples illustrate the invention in several of its embodiments, similar results to those illustrated are attained by employing the various other organosilicon compounds, polyfunctional alcohols, and organic polyisocyanates described herein in place of the corresponding materials of the examples. For instance, the polyfunctional alcohol can contain active hydrogens from other groups than hydroxyl, as in compounds such as 2-amino-1-propanol or 2-mercaptoethanol. These give laminates usable for some purposes but which are generally less desirable than those made from polyols for various reasons; for example, laminates from amino-containing materials have a tendency to discolor and those from mercapto-containing products often have a residual odor.

Similarly, differing and more complex polyols can be used, including various polyester and polyether polyols, such as a reaction product of 1 mole of sorbitol with 10 moles of propylene oxide (hydroxyl value 460, average molecular weight 762), or the product of 1 mole of sucrose and 11.5 moles of propylene oxide (hydroxyl value 497, average molecular weight 902), as well as other such products. Also, techniques other than those set forth can be employed; for example, the free polyfunctional alcohol which is often present in the organosilicon reaction products as produced in the above examples can be removed if desired.

According to the provisions of the patent statutes, there are described above the invention and what are now considered to be its best embodiments. However, within the scope of the appended claims, it is to be understood that the invention can be practiced otherwise than as specifically described.

What is claimed is:

1. A laminated glass article comprising at least one solid glass sheet having thereon an adherent layer of a polyurethane produced by the reaction of an organic polyisocyanate and a polyfunctional organosilicon compound having at least two active hydrogen-containing groups, the number of active hydrogen atoms per average molecule of said polyfunctional organosilicon compound being greater than two.

2. The laminated glass article of claim 1, in which said organic polyisocyanate is selected from the class consisting of
   (a) hydrocarbon polyisocyanates
   (b) isocyanato-terminated polyether adducts of an organic polyisocyanate and a polyether polyol, and
   (c) isocyanato-terminated polyester adducts of an organic polyisocyanate and a polyester polyol.

3. The laminated glass article of claim 1, in which said organic polyisocyanate is an isocyanato-terminated polyether adduct of an organic diisocyanate and a polyether polyol.

4. The laminated glass article of claim 3, in which said polyether polyol is poly(oxytetramethylene)glycol 5. A laminated glass article comprising at least one solid glass sheet having thereon an adherent layer of a polyurethane produced by the reaction of an organic polyisocyanate and a polyfunctional organosilicon compound having at least two silicon bonded groups of the structure —OX, where X is a substituted hydrocarbon radical containing at least one active hydrogen atom, the number of active hydrogen atoms per average molecule of said polyfunctional organosilicon compound being greater than two.

6. The laminated glass article of claim 5, in which said polyfunctional organosilicon compound is the reaction product of
   (a) an organosilicon compound containing at least one silicon atom and at least two silicon bonded groups of the structure —OR, where R is selected from the group consisting of hydrogen and alkyl, and
   (b) a polyfunctional alcohol containing at least two active hydrogen-containing functional groups, at least one of which is an alcoholic hydroxyl group.

7. The laminated glass article of claim 6, in which said organosilicon compound is an organosiloxane.

8. The laminated glass article of claim 6 in which said polyfunctional alcohol is a polyol.

9. The laminated glass article of claim 6 in which said polyfunctional alcohol comprises trimethylolpropane.

10. A laminated glass article comprising a plurality of solid glass sheets bonded together with a polyurethane produced by the reaction of an organic polyisocyanate and a polyfunctional organosilicon compound which is the reaction product of
(a) an organosiloxane of the formula:

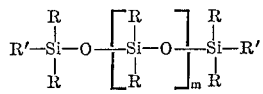

where each R is selected from the class consisting of alkyl and alkoxy groups of 1 to 4 carbon atoms and aryl, R' is an alkoxy group of 1 to 4 carbon atoms, and $m$ is 0 to 7, and
(b) a polyol,
the number of active hydrogen atoms per average molecule in said reaction product being greater than two.

11. The laminated glass article of claim 10, in which said polyol is at least partially trimethylopropane.

12. The laminated glass article of claim 10, in which said organosiloxane is dimethyltriphenyltrimethoxytrisiloxane.

13. A laminated glass article comprising a plurality of solid glass sheets bonded together with a polyurethane produced by the reaction of
(a) an isocyanato-terminated polyether adduct of organic polyisocyanate and a polyether polyl, and
(b) a polyfunctional organosilicon compound comprising an organosilicon compound having at least two groups of the structure —OX, where X is an active hydrogen-containing group, the number of active hydrogen atoms per average molecule of said polyfunctional compound being greater than two.

14. The laminated glass article of claim 13, in which said polyfunctional compound is the reaction product of a polyol and an organosilicon compound containing at least one silicon atom and at least two silicon bonded groups of the structure —OR, where R is selected from the group consisting of hydrogen and alkyl.

15. The laminated glass article of claim 14, in which the polyether polyol is poly(oxytetramethylene)glycol.

16. A method of producing glass laminates which comprises contacting at least one solid glass sheet with an uncured mixture of an organic polyisocyanate and a polyfunctional organosilicon compound and curing said mixture while in contact with said glass sheet, said polyfunctional organosilicon compound having at least two active hydrogen-containing groups and more than two active hydrogen atoms per average molecule.

17. The method of claim 16, in which said organic polyisocyanate is selected from the class consisting of
(a) hydrocarbon polyisocyanates
(b) isocyanato-terminated polyether adducts of an organic polyisocyanate and a polyether polyol, and
(c) isocyanato-terminated polyester adducts of an organic polyisocyanate and a polyester polyol.

18. The method of claim 16, in which said organic polyisocyanate is an isocyanato-terminated polyether adduct of an organic diisocyanate and a polyether polyol.

19. The method of claim 18, in which said polyether polyol is poly(oxytetramethylene)glycol.

20. The method of claim 16, in which said polyfunctional organosilicon compound is the reaction product of
(a) an organosilicon compound containing at least one silicon atom and at least two silicon bonded groups of the structure —OR, where R is selected from the group consisting of hydrogen and alkyl, and
(b) a polyfunctional alcohol containing at least one alcoholic hydroxyl group and a total of at least two active hydrogen-containing functional groups selected from the class consisting of hydroxyl, mercapto and amino.

21. The method of claim 20, in which said organosilicon compound is an organosiloxane and said polyfunctional alcohol is a polyol.

22. The method of claim 21, in which said organosiloxane is dimethyltriphenyltrimethoxytrisiloxane.

References Cited
UNITED STATES PATENTS

| | | | |
|---|---|---|---|
| 3,135,645 | 6/1964 | Burkley et al. | 161—165 |
| 3,257,343 | 6/1966 | Glaser | 260—77.5 |

FOREIGN PATENTS

| | | |
|---|---|---|
| 565,889 | 11/1968 | Canada. |

WILLIAM J. VAN BALEN, Primary Examiner

U.S. Cl. X.R.

156—99, 106; 117—124; 161—193